(12) United States Patent
Koeune et al.

(10) Patent No.: US 7,104,301 B2
(45) Date of Patent: *Sep. 12, 2006

(54) DISCONTINUOUS PLY FOR RUNFLAT TIRE CONSTRUCTION

(75) Inventors: Jean-Marie Koeune, Bastogne (BE); Jean-Claude Lahure, Luxembourg (LU); Xavier Fraipont, Vielsalm (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 251 days.

This patent is subject to a terminal disclaimer.

(21) Appl. No.: 10/772,753

(22) Filed: Feb. 5, 2004

(65) Prior Publication Data

US 2004/0226644 A1 Nov. 18, 2004

Related U.S. Application Data

(62) Division of application No. 09/889,248, filed on Jul. 11, 2001, now Pat. No. 6,712,108.

(51) Int. Cl.
*B60C 17/00* (2006.01)
*B60C 17/04* (2006.01)
*B60C 9/00* (2006.01)

(52) U.S. Cl. .................. 152/516; 152/520; 152/552; 152/555

(58) Field of Classification Search ................. None
See application file for complete search history.

(56) References Cited

U.S. PATENT DOCUMENTS 3,464,477 A 9/1969 Verdier
3,954,131 A 5/1976 Hoshino
4,111,249 A 9/1978 Markow et al.
4,287,924 A 9/1981 Deck et al.
5,368,082 A 11/1994 Oare et al.
5,427,166 A 6/1995 Willard, Jr.
5,511,599 A 4/1996 Willard, Jr.

FOREIGN PATENT DOCUMENTS

| EP | 0385192 | 9/1990 |
|---|---|---|
| EP | 0631889 | 1/1995 |
| EP | 0822105 | 2/1998 |
| JP | 1-297306 | 11/1989 |
| JP | 4154411 | 5/1992 |
| JP | 06340209 | * 12/1994 |
| JP | 7304312 | 11/1995 |

* cited by examiner

*Primary Examiner*—Justin Fischer
(74) *Attorney, Agent, or Firm*—Howard M. Cohn

(57) ABSTRACT

The innermost carcass ply of a runflat tire (50) having a radial carcass ply is a discontinuous ply (52) that includes two portions (52a, 52b) each disposed within one of the sidewalls (43, 45). In one embodiment, each of the two discontinuous ply portions is composed of two layers (64, 66) of cross-biased cords (65, 67) which are disposed between the two wedge inserts (58b, 59b) in each sidewall. In another embodiment, the two portions (72a, 72b) of the discontinuous ply (72) are composed of wavy metal cords. In a third embodiment, a runflat tire incorporating either embodiment of the discontinuous ply (92a, 92b) is built using the locked, tie-in construction for the carcass ply.

9 Claims, 4 Drawing Sheets

DISCONTINUOUS PLY FOR RUNFLAT TIRE CONSTRUCTION

CROSS-REFERENCE TO RELATED APPLICATIONS

This is a Divisional application of U.S. application Ser. No. 09/889,248 having a filing date of Jul. 11, 2001 now U.S. Pat. No. 6,712,108 and a common assignee with present application.

TECHNICAL FIELD

The present invention relates to the construction of pneumatic radial ply runflat tires and particularly to a ply component of the tire.

BACKGROUND OF THE INVENTION

Various methods have been devised for enabling the safe continued operation of unpressurized or underpressurized vehicle tires with the intent of minimizing further damage to the uninflated tire and without simultaneously compromising vehicle handling over a distance from the place where the tire has lost its pressure to a place desired by the driver, such as a service station, where the tire can be changed. Loss of tire pressure can, of course, result from a variety of causes, including puncture by a foreign object such as a nail or other sharp object piercing the pneumatic tire installed on a vehicle.

Pneumatic tires designed for sustained operation under conditions of no pressure or underpressurization are also called runflat tires, as they are capable of being driven, or "running," while uninflated, or in what is generally called a "flat" condition.

The conventional pneumatic tire, when uninflated, collapses upon itself when it is carrying the wheel loading of a vehicle. The tire's sidewalls buckle outward in the region where the tread contacts the ground, making the tire "flat."

Runflat tires are also called extended mobility tires, the latter phrase being compressed to EMT, which is a term of art. A tire designed for runflat or EMT operation is designed such that the tire structure alone, and in particular the structure of the sidewalls, has sufficient strength and rigidity to support the vehicle's wheel load and provide adequate vehicle handling when the tire is not inflated. The sidewalls and internal surfaces of EMT tires do not collapse or buckle onto themselves. Such tires do not typically contain or use other supporting structures or devices to prevent the collapse into a flattened condition due to loss of tire pressure.

Among the many examples of runflat tires is a tire described in U.S. Pat. No. 4,111,249, entitled the "Banded Tire," in which a hoop or annular band, approximately as wide as the tread, is circumferentially deployed beneath the tread. The hoop in combination with the rest of the tire structure could support the vehicle weight in the uninflated condition.

Another approach toward EMT or runflat technology has been simply to strengthen the sidewalls by increasing their cross-sectional thickness. That is, runflat tires incorporate sidewalls that are thicker and/or stiffer so that the tire's load can be carried by an uninflated tire with minimum adverse effects upon the tire itself and upon vehicle handling until such reasonable time as the tire can be repaired or replaced. However, due to the large amounts of rubber required to stiffen the sidewall members, cyclical flexural heating during runflat operation becomes a major factor in tire failure. This is especially so when the uninflated tire is operated for high speeds and the cyclical flexure rate is correspondingly high. Pirelli discloses an example of a runflat tire design having thickened sidewalls in European Pat. Pub. No. 0-475-258A1.

Typical methods used in sidewall thickening and stiffening include the incorporation of circumferentially disposed "wedge inserts" within the concave inner peripheral surface of the sidewall portion of the carcass, which is the region in the tire usually having the lowest resistance to deformation under vertical loading. The wedge inserts, which are often referred to simply as inserts, are usually crescent shaped in cross-sectional views. The incorporation of one or more wedge inserts within each sidewall of a tire thickens the sidewalls substantially. Sidewall thickness in the region between the bead and the tread shoulder is often nearly uniform, when viewed in cross section.

U.S. Pat. No. 5,368,082, by Oare et al, having a common assignee, discloses a low-aspect-ratio, runflat pneumatic radial ply tire which employs wedge inserts in the sidewalls. Approximately six additional pounds of weight per tire was required to support an 800 lb load in this uninflated tire. This invention, although superior to prior attempts at runflat tire design, imposed a weight penalty. Fortunately, that weight penalty could be offset by the elimination of a spare tire and the tire jack. However, this weight penalty becomes even more problematic in the design of tires having higher aspect ratios and in tires designed for high performance.

U.S. Pat. Nos. 5,427,166 and 5,511,599 to Walter L. Willard, Jr., disclose the addition of a third ply and the addition of a third insert in the sidewall of a runflat tire to theoretically further increase the runflat performance of the tire over that of the U.S. Pat. No. 5,368,182. The Willard patents discuss some of the load relationships that occur in the uninflated condition of the tire and demonstrate that the Oare et al. concept can be applied to additional numbers of plies and inserts.

In general, runflat tire design is predicated upon the installation of reinforcing inserts inside each sidewall flex area. The inserts in each sidewall, in combination with the plies, add rigidity to the sidewalls in the absence of air pressure during runflat operation. The U.S. Pat. No. 5,368,082 teaches a sidewall construction for runflat tires in which the tire is constructed with two plies, an inner liner and two reinforcing wedge inserts in each sidewall. The two inserts in each sidewall are disposed such that one insert is located between the two plies while the other insert is located between the inner liner and the first or innermost ply.

While the high resistance to compression deflection of the inserts provides the necessary resistance to the collapse of the uninflated loaded tire, the use of multiple plies and more than one reinforcing wedge insert in each sidewall has drawbacks which include the above mentioned increase in tire weight and flexure-induced heat build up. Such designs also increase the tire's complexity in ways that adversely affect manufacturing operations and quality control.

U.S. Pat. No. 4,287,924, by Deck et al, places a two part reinforcing wedge inside the carcass which is described as: "a support member (20) of lenticular section, made of an elastomer and extending from the vicinity of the beads (12) to below the edges of the belt . . . [and] constituted by two parts with different flexibility . . . . " In order to promote evacuation of the heat produced in the thick part of the supporting shaped parts (20), means are provided which consist of a heat-conducting sheet or layer (28) embedded in the body of shaped parts (20) and extending at least to the vicinity of beads (12). Preferably the layer extends over the whole height of shaped parts (20), from the upper part of the side walls adjacent to the belt of crown (23) to the vicinity of the beads. The layer (28) is advantageously disposed between the two parts of shaped part (20), and can be constituted for example by flexible parallel metallic cords extending along the radial planes of the tire.

European Patent Application No. EP 0 822 105 A2, by Walter et al (Michelin), comprises a plurality of crescent-shaped reinforcing members (5) and a plurality of carcass layers (6), and provides first and second partial carcass layers (62, 64) along with a filler rubber portion (24) and a second crescent-shaped reinforcing member (56). In the Walter application's FIG. 4, it can be determined that the placement of elements in the sidewall, from the inside out, is: innerliner (44), first crescent-shaped reinforcing member (54), inner carcass layer (68), second crescent-shaped reinforcing member (56), first partial carcass layer (62), filler rubber portion (24), second partial carcass layer (64), and outer sidewall (42). The filler rubber portion is placed above the bead similar to an apex. FIG. 6 shows a variation with a different shaped filler rubber portion (24a), but still places the wedges (54, 56) on either side of the inner carcass layer, and places the partial carcass layers (62, 64) axially outside of the [complete] carcass layer (68). The partial carcass layers extend from the vicinity of the bead up under the crown region to a specified distance (L1) axially inside of the edge of the tread belt. As best it can be determined, the partial carcass layers are comprised of standard carcass ply materials.

In summary, the goals in runflat tire design are to provide a low-cost, light-weight tires that give good runflat vehicle handling as well as good service life during runflat operation. Accordingly, the considerations that must be taken into account in runflat tire design include the use of minimal additional material to the tire (to achieve the desired sidewall stiffness) as well as minimal additional steps in the manufacturing process.

Among the design considerations for EMT or runflat technology is the nature of the sidewall loading and corresponding stresses that arise during runflat operation. For example, during runflat operation, the insert-reinforced sidewalls still undergo an outward or axial buckling (though not to the extreme extent of an uninflated non-runflat tire) in the region adjacent to where the tire's tread makes contact with the road. Such "loading" of the sidewalls causes them to deform in such a way that the outermost portions of the sidewalls, including especially the outermost carcass plies, experience tensile stresses. At the same time, the innermost portions of the insert-reinforced sidewalls, e.g., the portions of each wedge insert that lie closest to the tire's innerliner, experience large increases in compressive stresses. This combination of tensile and compressive stresses is also cyclical as the tire rotates. It follows that as the vehicle moves faster, the rate of flexural heat buildup increases.

OBJECTS OF THE INVENTION

It is an object of the present invention to provide a runflat radial tire as defined in one or more of the appended claims and, as such, having the capability of being constructed to accomplish one or more of the following subsidiary objects.

One object of the present invention is to provide a runflat radial tire having a minimum number of components and requiring fewer manufacturing steps than prior art designs.

One object of the present invention is to provide a runflat radial tire having a minimum number of components and requiring fewer manufacturing steps than prior art designs.

Another object of the present invention is to provide a runflat radial tire having a simplified ply structure that reduces the overall tire weight.

Another object of the present invention is to provide a runflat radial tire whose simplified manufacturing sequence allows for improved manufacturing quality control.

Yet another object of the present invention is to provide a runflat tire having good normal inflation handling characteristics as well as good runflat handling properties and runflat operational service life.

Still another object of the present invention is to apply the inventive concept to a variety of alternative tire sizes and aspect ratios.

SUMMARY OF THE INVENTION

The present invention relates to a pneumatic radial ply runflat tire having a tread, a carcass comprising a radial ply structure, a belt structure located between the tread and the radial ply structure, and two sidewalls each reinforced by two wedge inserts. Each sidewall contains one portion each of a two-part discontinuous ply disposed between the wedge inserts in each sidewall. Each of the two portions of the two-part discontinuous ply of the present invention is made from two layers of cross-biased fabric. Each of the layers comprises parallel-aligned cords made from materials from the class of materials that contains nylon and rayon. The parallel-aligned cords of the respective fabric layers are each oriented at an angle with respect to the radial direction that is more or less equal in magnitude but opposite in direction, making angles with respect to the radial direction that are preferably between 40 degrees and 65 degrees and most preferably at angles with respect to the radial direction of 45 degrees and 55 degrees.

In another embodiment, each portion of the two-part, discontinuous ply or semi-ply of the present invention is made from a single layer of metal cords that are wavy with respect to the radial direction. The metal cords are preferably made of steel.

In yet another embodiment, the two-part, discontinuous ply invention, in either of the two constructions generally described above, is incorporated in a tire built according to the locked tie-in construction method.

BRIEF DESCRIPTION OF THE DRAWINGS

The structure, operation, and advantages of the invention will become further apparent upon consideration of the following description taken in conjunction with the accompanying drawings, wherein.

DEFINITIONS

Figure 1:
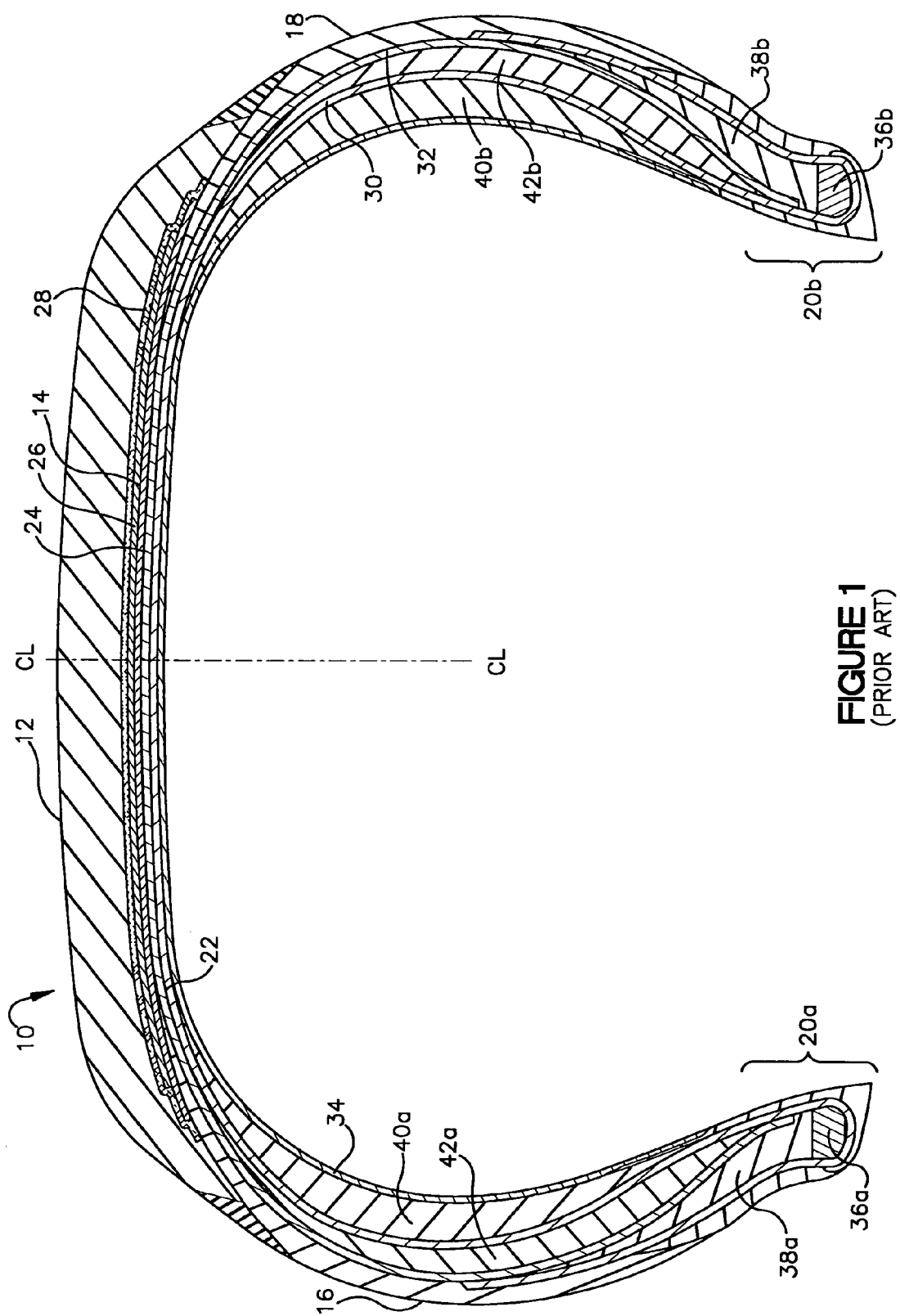
FIG. 1 is a cross-sectional view of a prior art runflat tire design incorporating two wedge inserts in each sidewall and two plies in the ply structure.

"Apex" refers to an elastomeric filler located radially above the bead core and between the plies and the turnup plies.

"Aspect ratio" means the ratio of the section height of a tire to its section width; also refers to the cross-sectional profile of the tire; a low-profile tire, for example, has a low aspect ratio.

"Axial" and "axially" means the lines or directions that are parallel to the axis of rotation of the tire.

"Bead" or "bead core" generally means that part of the tire comprising an annular tensile member of radially inner beads that are associated with holding the tire to the rim; the beads being wrapped by ply cords and shaped, with or without other reinforcement elements such as flippers, chippers, apexes or fillers, toe guards and chafers.

"Belt structure" or "reinforcement belts" or "belt package" means at least two annular layers or plies of parallel cords, woven or unwoven, underlying the tread, unanchored to the bead, and having both left and right cord angles in the range from 18° to 30° relative to the equatorial plane of the tire.

"Breakers" or "tire breakers" means the same as belt or belt structure or reinforcement belts.

"Carcass" means the tire structure apart from the belt structure, tread, undertread over the plies and the sidewalls, but including the beads, plies, and, in the case of EMT or runflat tires, the wedge inserts sidewall reinforcements.

"Casing" means the carcass, belt structure, beads, sidewalls and all other components of the tire excepting the tread and undertread.

"Circumferential" most often means circular lines or directions extending along the perimeter of the surface of the annular tread perpendicular to the axial direction; it can also refer to the direction of the sets of adjacent circular curves whose radii define the axial curvature of the tread, as viewed in cross section.

"Cord" means one of the reinforcement strands, including fibers or metal or fabric, with which the plies and belts are reinforced.

"Crown" or "tire crown" means the tread, tread shoulders and the immediately adjacent portions of the sidewalls.

"Equatorial plane" means the plane perpendicular to the tire's axis of rotation and passing through the center of its tread; or the plane containing the circumferential centerline of the tread.

"Footprint" means the contact patch or area of contact of the tire tread with a flat surface at zero speed and under normal load and pressure.

"Gauge" refers to thickness.

"Inner liner" means the layer or layers of elastomer or other material that form the inside surface of a tubeless tire and that contain the inflating fluid within the tire.

"Insert" means the crescent- or wedge-shaped reinforcement typically used to reinforce the sidewalls of runflat-type tires; it also refers to the elastomeric non-crescent-shaped insert that underlies the tread; it is also called a "wedge insert."

"Lateral" means a direction parallel to the axial direction.

"Normal inflation pressure" means the specific design inflation pressure at a specified load assigned by the appropriate standards organization for the service condition for the tire.

"Normal load" means the specific design inflation pressure and load assigned by the appropriate standards organization for the service condition for the tire.

"Ply" means a cord-reinforced layer of rubber-coated radially deployed or otherwise parallel cords.

"Radial" and "radially" mean directions radially toward or away from the axis of rotation of the tire.

"Radial ply structure" means the one or more carcass plies or which at least one ply has reinforcing cords oriented at an angle of between 65° and 90° with respect to the equatorial plane of the tire.

"Radial ply tire" means a belted or circumferentially-restricted pneumatic tire in which at least one ply has cords which extend from bead to bead are laid at cord angles between 65° and 90° with respect to the equatorial plane of the tire.

"Section height" means the radial distance from the nominal rim diameter to the outer diameter of the tire at its equatorial plane.

"Section width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge.

"Sidewall" means that portion of a tire between the tread and the bead.

"Tangential" and "tangentially" refer to segments of circular curves that intersect at a point through which can be drawn a single line that is mutually tangential to both circular segments.

"Toe guard" refers to the circumferentially deployed elastomeric rim-contacting portion of the tire axially inward of each bead.

"Tread cap" refers to the tread and the underlying material into which the tread pattern is molded.

"Tread width" means the arc length of the tread surface in the plane includes the axis of rotation of the tire.

"Wedge insert" means the same as "insert."

DETAILED DESCRIPTION OF THE PREFERRED EMBODIMENT

Prior Art Embodiment

With reference to FIG. 1, a cross-sectional view of a typical prior art, pneumatic radial runflat tire 10. The tire 10 has a tread 12, sidewalls 16, 18, a belt structure 14 comprising belts 24, 26, a fabric overlay 28 disposed between the tread and the belt structure, bead regions 20a, 20b, and a carcass structure 22. The carcass structure 22 comprises a first ply 30 and a second ply 32, a gas-impervious inner liner 34, a pair of beads 36a, 36b, a pair of bead filler apexes 38a, 38b, a first pair of crescent-shaped sidewall wedge inserts 40a, 40b, and a second pair of sidewall wedge inserts 42a, 42b. The first or innermost wedge inserts 40a, 40b are located between the inner liner 34 and the first ply 30, and the second wedge inserts 42a, 42b are located between the first ply 30 and second ply 32. The reinforced sidewall portions 16, 18 of carcass structure 22 give the tire 10 runflat capability.

The generalized prior art runflat tire 10 shown in FIG. 1 illustrates the structural reinforcements in the sidewall area of a two-ply carcass design. Other runflat or EMT designs employ a single ply carcass structure. They also might use a single wedge-insert reinforcement within each sidewall, disposed between the inner liner and the single ply. In other two-ply EMT designs, a single wedge insert might be disposed within each sidewall between the two plies. Prior art runflat designs even include three-ply tires having three wedge inserts within each sidewall, as mentioned above in the Background of the Invention.

As can be seen in FIG. 1, the use of the wedge inserts 40a, 40b, 42a, and 42b substantially increases the thickness of the sidewall portions 16, 18 as compared to comparable non-runflat tires. The sidewalls 16, 18 have more or less uniform thickness between in the bead regions 20a, 20b and the lateral most portions of the tread 12. This generalized prior art runflat tire design exemplifies the thickened sidewalls that characterize EMT or runflat tire designs. When the tire 10 is uninflated, the insert-reinforced sidewalls 16, 18 support the tire's load with minimal deflection. Such runflat tire designs provide good vehicle handling and performance under conditions of full inflation, and they provide acceptable runflat vehicle handling and runflat operational life when the tire is underinflated or uninflated. Runflat tires generally weigh more than equivalent non-runflat-capable tires, due to the reinforcing material used in the sidewall wedge inserts. Furthermore, the greater structural complexity of runflat tires adversely influences manufacturing time and quality control.

When the prior art tire 10 shown in FIG. 1 is operated in a condition of low to zero inflation pressure, the portions of the sidewalls that are closest to where the tread makes contact with the ground become deflected outward axially. In non-runflat designs, this same sort of outward or axial deflection of the sidewalls also takes place, of course, but to such an extreme degree that the vehicle cannot be controlled when the tire loses pressure. The tire can even come off the rim, due to the extreme deformation of the carcass. In runflat designs, the axial deflection of the sidewalls adjacent to the ground-contacting portion of the tread is minimized by the thick, wedge-insert reinforced, sidewalls. Those skilled in the art will recognize that such axial deformation of the sidewalls gives rise to a combination of tensile and compressive stresses within the sidewalls. More specifically, the outermost portion of each sidewall experiences tensile stresses while the inner regions undergo compression stresses. Those skilled in the art will further recognize that the thicker the reinforced sidewalls are, the lower will be the maximum respective tensile and compressive stresses. However, the use of such thicker sidewall reinforcements also makes the tire heavier.

Accordingly, one way to reduce the weight of a runflat tire is to modify the design of the type of two-ply runflat design shown in FIG. 1. The inner ply 30, which is also known as the first ply (a nomenclature which follows the sequence in which the components of the tire are assembled), separates the innermost inserts 40a, 40b from the outermost inserts 42a, 42b. Within the sidewalls regions 16, 18, the first ply 30 is disposed in such a way between the respective wedge inserts as to be exposed primarily and almost exclusively to cyclical compressive stresses during normal operation but most especially during runflat operation when sidewall flexing magnitudes are maximum. It is the second ply 32 that bears the tensile stresses associated with deformation of the sidewalls 16, 18.

The exposure of the first ply 30 to compressive stresses during runflat operation of the tire, and the precise location of the first ply in relation to the respective insert reinforcements 40a, 40b, 42a and 42b, works in such a way as to enhance the combined stiffness of the wedge inserts in each sidewall. In other words, the disposition of the ply 30 between the respective wedge inserts 40a, 40b, 42a, and 42b in each sidewall gives the two wedge inserts in each sidewall a greater resistance to deformation than were the ply 30 does not separate the two wedge inserts in each sidewall. The net effect, therefore, of the ply 30 being disposed between the respective wedge inserts allows for a runflat tire design in which the total weight of the two inserts in each sidewall can be less than the corresponding weight of a single large insert affording an equivalent stiffening effect to the sidewalls of a runflat tire design.

An Embodiment of the Present Invention

Recognizing the above described benefits of the ply 30 disposed between the respective inserts 40a, 40b, 42a, and 42b within each sidewall of the prior art runflat tire depicted in FIG. 1, the present invention seeks to achieve a reduction of tire weight and a simplification of the tire's design and construction complexity by eliminating the portion of the first ply that underlies the tread 12.

Figure 2:
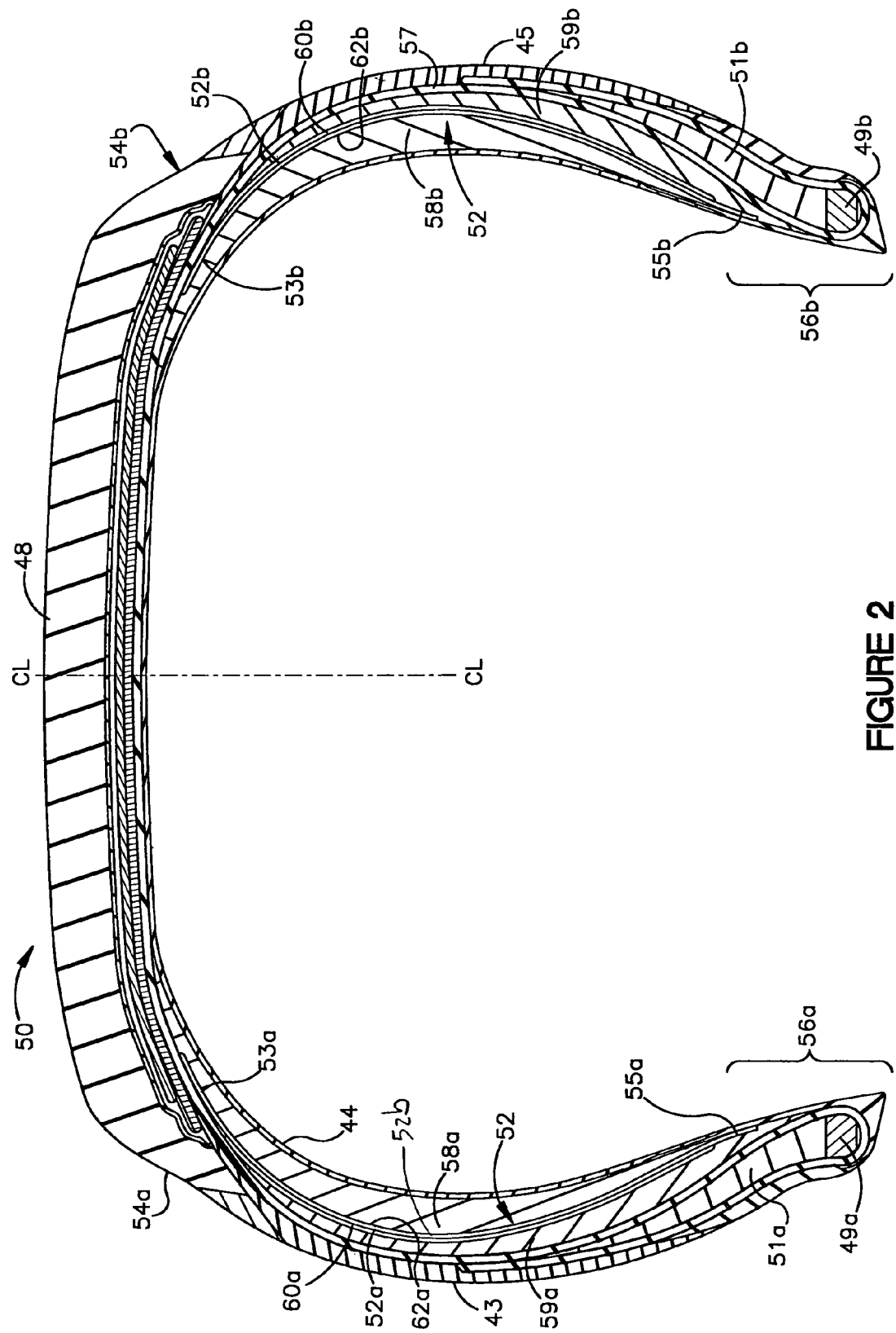
FIG. 2 is a cross-sectional view of a tire containing the present invention.

FIG. 2 shows a cross-sectional view of a tire 50 incorporating one embodiment of the two-part discontinuous ply or semi-ply of the present invention. The two-part semi-ply, or discontinuous ply 52 is defined by two portions 52a, 52b, each of which is disposed in the flex region of a sidewall 43, 45, respectively, of the tire 50. The tire 50 has a tread 48, sidewalls 43, 45, bead regions 56a, 56b, and a carcass structure which comprises a discontinuous inner first ply 52 and an outer second ply 57, a gas-impervious innerliner 44, a pair of beads 49a, 49b, a pair of bead filler apexes 51a, 51b, a first pair of crescent-shaped sidewall wedge inserts 58a, 58b, and a second pair of sidewall wedge inserts 59a, 59b. The first or innermost wedge inserts 58a, 58b are located between the inner liner 44 and the discontinuous first ply 52, and the second wedge inserts 59a, 59b are located between the discontinuous first ply 52 and second ply 57. In FIG. 2, the semi-ply portion 52a extends from the radially inwardmost position 55a to the radially outwardmost position 53a in sidewall 43, while the semi-ply portion 52b is a mirror-image version of semi-ply portion 52a in sidewall 45. The two ply portions 52a, 52b constitute the total discontinuous ply 52 that replaces the first ply 30 of the prior art tire 10 shown in FIG. 1.

Figure 3:
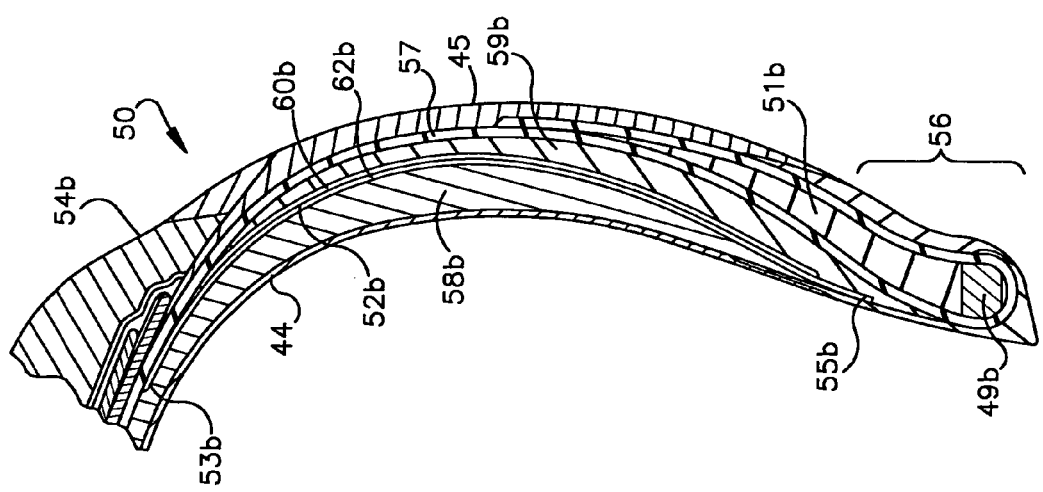
FIG. 3 is a cross-sectional view of a two-layer non-metallic fabric reinforced ply according to a first embodiment of the invention.

FIG. 3 shows a cross-sectional view of one sidewall 45 of the tire 50 shown in FIG. 2. The two-layer, semi-ply portion 52b comprises an outer fabric layer 60b and an inner fabric layer 62b. An inner wedge insert 58b is separated from an outer wedge insert 59b by the semi-ply portion 52b. The semi-ply portion 52b extends radially outward from the location 55b near or in the bead region 56b to a location 53b near the shoulder 54b of the sidewall 45 of the tire 50. In other words, the semi-ply portion 52b and its counterpart 52a (in FIG. 2) are disposed in the flex area of the sidewalls 45, 43, respectively, of the tire 50 shown in FIG. 2.

In FIG. 3, the discontinuous or semi-ply portion 52b separates the first wedge insert 58b from the second wedge insert 59b in such a way as to afford the sidewall 45 the same stiffening benefit provided by the corresponding part of the first ply 30 in the prior art tire 10 shown in FIG. 1. However, since the semi-ply portion 52b in FIG. 3 is not contiguous with its mirror-image counterpart, semi-ply portion 52a in the opposite sidewall 43 on the other side of the tire, a reduction in the weight of the tire 50 is thereby gained. In other words, the weight reduction afforded by the present invention comes about from the elimination of that portion of the prior art first ply (30 in FIG. 1) which extends across the tire's crown portion beneath the tread 12 of the tire 10. The incorporation of such semi-ply portions 52a, 52b, as shown in FIGS. 2 and 3, contributes to the combined reinforcing rigidity of each sidewall 43, 45 as brought about primarily by the use of two wedge inserts 58a, 58b, 59a and 59b shown in FIG. 2.

Figure 4:
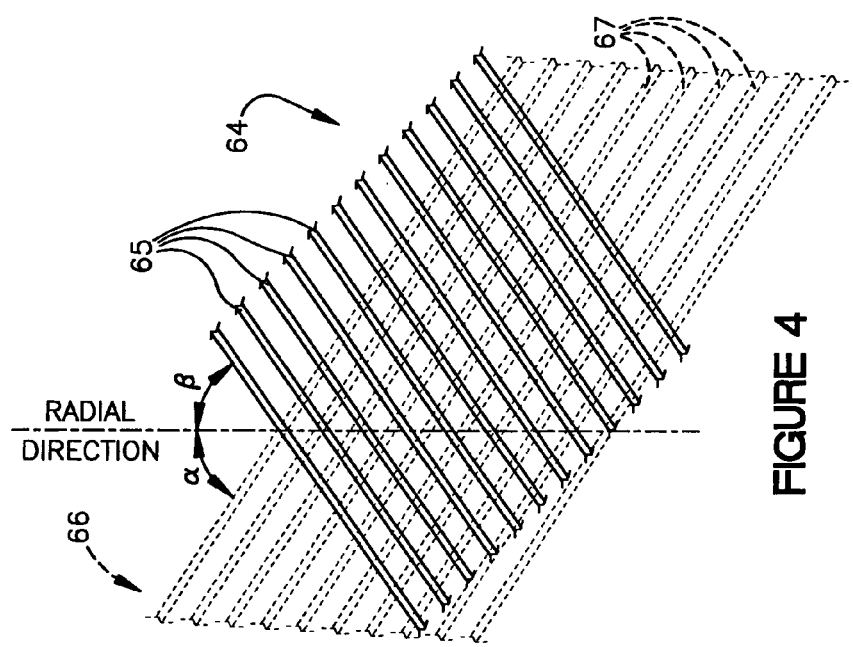
FIG. 4 shows the orientation of the reinforcing cords in the view of the embodiment shown in FIG. 3.

The discontinuous ply portion 52b illustrated in FIG. 3 comprises two fabric layers 60b, 62b, each of which comprises parallel-aligned fibers or cords made of materials from the class of materials that includes nylon and rayon. FIG. 4 shows the fabric layers 64, 66 and their respective parallel-aligned cords 65, 67. The parallel-aligned cords 65, 67 have respective bias angles β and α, as shown in FIG. 4. The bias angles β and α are measured with respect to the radial direction and they are approximately equal in magnitude. The angles β and α are preferably between 40 degrees and 65 degrees relative to the radial direction, and most preferably between 45 degrees and 55 degrees. Below 40 degrees, the parallel aligned ends 65, 67 are not able to adequately withstand the compression generated on the sidewalls and shoulders and thereby can allow the cords to buckle because they do not remain in the tension mode. Alternatively, we do not want to exceed 65 degrees because of limitations in the manufacturing process. In other words, the bias angles of the parallel-aligned cords 65, 67 of fabric layers 64, 66, respectively, are oriented at crossed bias angles that are more or less equal in magnitude with respect to the radial direction, but opposite in direction, as shown in FIG. 4.

The two fabric layers 60b, 62b shown in FIG. 3 are encapsulated between the two rubber wedge inserts 58b, 59b. Thus located, the discontinuous ply 52 (FIG. 2) contributes compression stiffness to the two wedge inserts of the sidewalls 43, 45 shown in FIG. 2. The increased bending stiffness thus afforded to the sidewalls gives the tire runflat mobility with reduced sidewall bending deflection. Overall tire weight is also reduced compared to the typical prior art tire 10 shown in FIG. 1.

Alternative Embodiment

Figure 6:
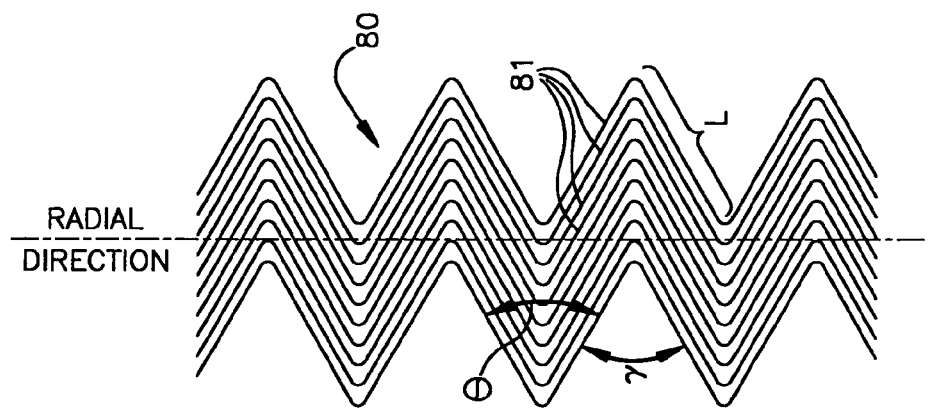
FIG. 6 shows the structure of the metal reinforcing cords that are incorporated in the embodiment shown in FIG. 5.
Figure 5:
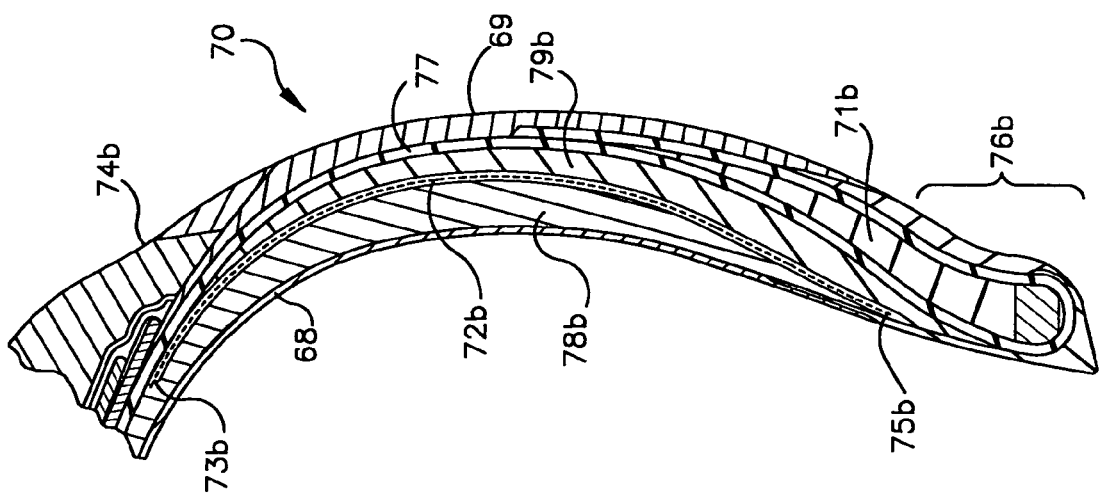
FIG. 5 is a cross-sectional view of a metal reinforced ply according to a second embodiment of the invention.

An alternative embodiment of the two-part discontinuous ply of the present invention is shown in the sidewall 70 shown in a cross-sectional view in FIG. 5. The discontinuous inner or first ply 72 of the alternative embodiment includes a ply portion 72b between a first sidewall wedge insert 78b and a second sidewall wedge insert 79b, all located inside a second, outer carcass ply 77 in the sidewall flex area which extends approximately from the location 75b near the bead region 76b to the approximate location 73b near the shoulder 74b. However, instead of being made of crossed-biased fabric layers as shown in FIGS. 2 and 3, this alternative embodiment of the discontinuous ply portion 72b (and its unshown counter part in the opposite sidewall) consists of a layer 80 of steel or fabric cords 81, as shown in FIG. 6, that are parallel to each other and wavy with respect to the radial direction. The waviness of the layer 80 is defined by the angles γ and θ having a range of between 50 degrees and 100 degrees. The cords can be constructed of metal or fabric and preferably of steel.

The waviness of the cords 81 minimizes the potential for buckling as they are subjected to the compressive stresses associated with runflat operation of a tire incorporating this embodiment of the discontinuous ply of the present invention. In other words, if the cords 81 were not wavy and were oriented at a low angle relative to the radial direction, the cords would be more prone to buckling during runflat operation. Such buckling of parallel-aligned, radially oriented cords would contribute to the potential for separation of the cords from the adjacent rubber, an effect that could shorten the runflat operational service life of the tire.

As compared with the fabric concept of the first embodiment of the present invention, as shown in FIGS. 3 and 4, the wavy cord reinforcing, two-part discontinuous ply 72 depicted in FIGS. 5 and 6 has two additional benefits. First, the overall thickness of the sidewall 70 (and its unshown mirror-image counterpart on the other side of the tire) can be less than the corresponding thickness of the sidewall 45 of the tire 50 shown in FIGS. 2 and 3 incorporating the crossed-bias fabric version 52a, 52b of the discontinuous semi-ply invention. Second, whereas the crossed-bias fabric discontinuous ply 52a, 52b requires the inclusion of four components during construction of the tire (i.e., two fabric layers in each sidewall), the cord embodiment 80 (shown in FIG. 6) of the two-part discontinuous ply 72 requires the inclusion of only two semi-ply portions, one in each sidewall, which simplifies the manufacturing and subsequent quality control processes. Third, the wavy cord embodiment can weigh less than the embodiment shown in FIGS. 3 and 4.

The respective embodiments shown in FIGS. 3 and 4 and in FIGS. 5 and 6 are both applicable to mono-ply carcasses in which the single continuous second ply 57, 77 can be reinforced with more or less radially oriented fibers or cords made of either organic fibers or metal. FIGS. 3 and 5 show the two embodiments of the invention within respective sidewall portions 45 and 70 wherein the respective continuous mono-ply segments 57 and 77 are built according to the standard construction wherein respective apexes 51b and 71b (and their unshown mirror image counterparts) are included near the respective bead regions 56b and 76b.

Locked Tie-in Construction

Figure 7:
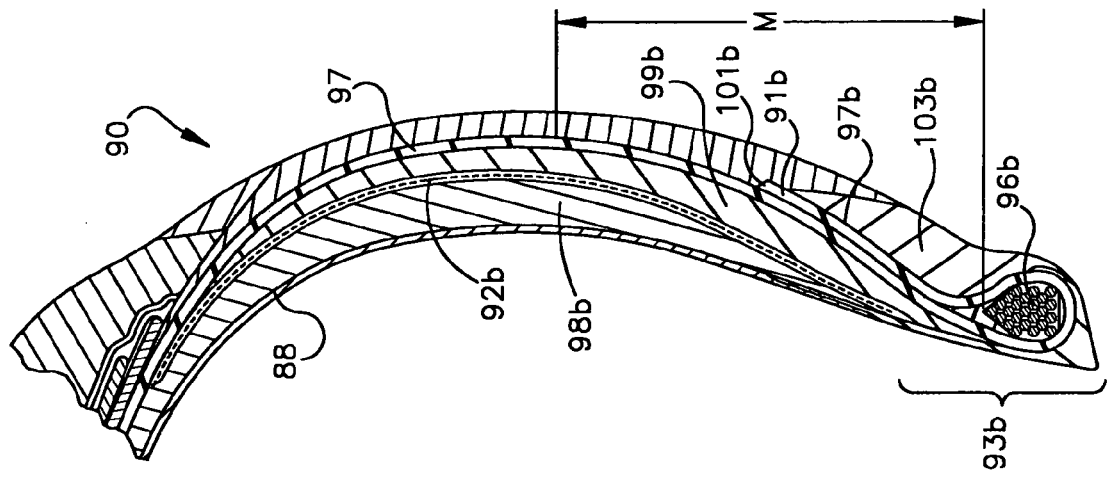
FIG. 7 is a cross-sectional view of an embodiment of the invention in which the tire's main carcass ply employs the locked tie-in construction method.

FIG. 7 shows an embodiment of the invention in which a tire sidewall region 90 is built according to the locked tie-in method of construction. In the locked tie-in construction method, the single continuous ply 97 wraps around the bead 96b (and its counterpart, unshown) in such a way that the apexes 51a, 51b, 71b of the other two embodiments, shown in FIGS. 2, 3, and 5 are effectively eliminated from the bead region 93b. That is, the turn-up end 97b (and its counterpart, unshown on the other side of the tire) of the continuous carcass ply 97 are assembled in such a way as to make the turn-up ends 97b more or less contiguous with the main structural portion of ply 97, which extends between bead regions 93b, of the continuous carcass ply 97. The free end 101b of ply turn-up end 97b extends from a location above the bead 96b upward to the mid-height of the sidewall 90. In this embodiment, the discontinuous ply portion 92b (and its unshown counterpart) is, as in the previous embodiments, disposed radially across the sidewall flex area of the sidewall 90 between a first sidewall wedge insert 98b and a second sidewall wedge insert 99b, all located inside a second, outer carcass ply 97. The discontinuous ply 92b shown in FIG. 7 can be of the fabric type displayed in FIGS. 2, 3 and 4, or the wavy cord type displayed in FIGS. 5 and 6.

The Invention in Relationship to Specific Prior Art

U.S. Pat. No. 5,435,370 ('370), to Ahmad et al., entitled "Pneumatic Tire Having Discontinuous Outer Carcass Ply," discloses a pneumatic tire having a "second ply in continuous contact with the inner ply has two section disposed such that the second ply is discontinuous or interrupted in the crown area." One significant difference between the disclosure of the '370 patent and the present invention is that the prior art tire is not designed for runflat service. Additionally, the discontinuous ply disclosed in the '370 patent is the second or outermost ply, whereas in the present invention the two-part discontinuous ply is the first or innermost ply, and the two plies of '370 are in "continuous contact" with one another. Also, in the present invention, each of the two parts of the discontinuous semi-ply is designed to resist compressive stresses, while the respective two parts of the discontinuous carcass ply of '370 is disposed in a region exposed to tensile stresses in the portions of the sidewalls (adjacent to the portion of the tread that makes contact with the ground) that cannot effectively resist compressive stresses and therefore buckles outward during normal inflated service and, especially, when the tire is uninflated.

patent application Ser. No. PCT/US98/20567, entitled, "Improved Construction for Runflat Tire," and having a common assignee with the present invention, discloses a runflat tire design having a single wedge insert in each sidewall of a tire having one or more carcass plies, both of which are disposed outward of the single wedge insert in each sidewall. Accordingly, the present invention might actually be construed to disclose a runflat tire design in which each the two wedge inserts within each sidewall are tantamount to a single reinforced wedge insert in each sidewall, equivalent to, for example, the incorporation of fiber filler in the single wedge insert. However, an important difference is that each of the two discontinuous semi-plies of the present invention experiences and undergoes the same stresses and strains as are encountered in the sidewall regions by the first ply 30, shown in FIG. 1, which separates the sets of double inserts, 40*a*, 42*a*, 40*b* and 42*b* in the generalized prior art runflat tire shown in FIG. 1. In other words, each of the two parts of the discontinuous semi-ply of the present invention performs precisely the same sidewall reinforcing functions as does the first ply 30 of the generalized prior art runflat tire depicted in FIG. 1, but with the benefits described above.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed is:

1. A pneumatic radial ply runflat tire having a tread; two sidewalls with shoulders; a carcass comprising one or more outer radial carcass plies, two bead regions each containing an inextensible annular bead, an innerliner, a two-part discontinuous ply with one portion contained in each sidewall and disposed between two wedge inserts of substantially equal flexibility; and one or more belts located between the tread and the outer radial carcass ply, the tire comprising;

each combination of two wedge inserts with the portion of the two-part discontinuous ply is in a sidewall flex area located axially between the one or more outer radial carcass plies and the innerliner, and extending radially approximately from a location near the bead region to an approximate location near the shoulder;

each of the two portions of the two-part discontinuous ply is made from two layers of cross-biased fabric;

each of the cross-biased fabric layers is made of parallel-aligned cords;

the parallel-aligned cords of a first fabric layer are oriented at an angle with respect to the radial direction that is approximately equal in magnitude but opposite in direction to the parallel-aligned cords of a second fabric layer of the two layers of cross-biased fabric; and the parallel-aligned cords of the respective fabric layers are oriented at angles of between 40 degrees and 65 degrees with respect to the radial direction.

2. The tire of claim 1 characterized in that:
the parallel cords are made of metal.

3. The tire of claim 2, characterized in that:
the parallel cords are made of steel.

4. The tire of claim 1, characterized in that:
the parallel cords are made of fabric.

5. The tire of claim 1 characterized in that:
the parallel-aligned cords of the respective fabric layers are made of materials from the class of materials that includes nylon and rayon.

6. The tire of claim 1 characterized in that:
each of the two portions of the two-part discontinuous ply is made from one or more layers of parallel cords which are wavy with respect to the radial direction such that the parallel cords of each of the one or more layers are defined by angles that are between 50 degrees and 100 degrees.

7. The tire of claim 6, characterized in that:
the parallel cords are made of metal.

8. The tire of claim 1 characterized in that:
turn-up ends of the outer radial carcass ply are substantially contiguous with the main structural portion of the outer radial carcass ply; and the free ends of the ply turn up ends extend from above the corresponding bead upward to the mid-height of the sidewall.

9. A pneumatic radial ply runflat tire having a tread; two sidewalls with shoulders; a carcass comprising one or more outer radial carcass plies, two bead regions each containing an inextensible annular bead, an innerliner, a two-part discontinuous ply with one portion contained in each sidewall and disposed between two wedge inserts of substantially equal flexibility; and one or more belts located between the tread and the outer radial carcass ply, the tire comprising;

each combination of two wedge inserts with the portion of the two-part discontinuous ply is in a sidewall flex area located axially between the one or more outer radial carcass plies and the innerliner, and extending radially approximately from a location near the bead region to an approximate location near the shoulder;

each of the two portions of the two-part discontinuous ply is made from two layers of cross-biased fabric;

each of the cross-biased fabric layers is made of parallel-aligned cords;

the parallel-aligned cords of a first fabric layer are oriented at an angle with respect to the radial direction that is approximately equal in magnitude but opposite in direction to the parallel-aligned cords of a second fabric layer of the two layers of cross-biased fabric; and the parallel-aligned cords of the respective fabric layers are preferably oriented at angles of between about 45 and 55 degrees with respect to the radial direction.

* * * * *